Sept. 6, 1960 H. R. DAY, JR 2,951,899
INFORMATION STORAGE METHOD AND APPARATUS
Filed Aug. 30, 1954
FIG. 1, FIG. 9
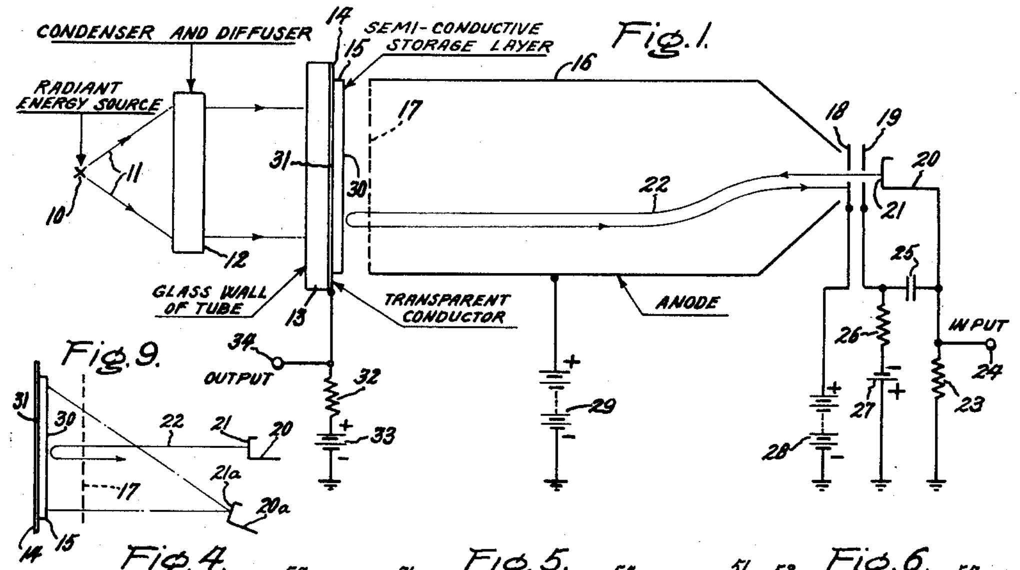
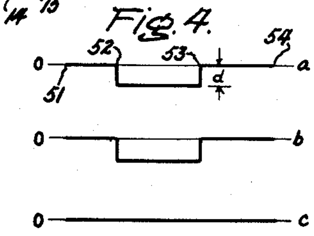
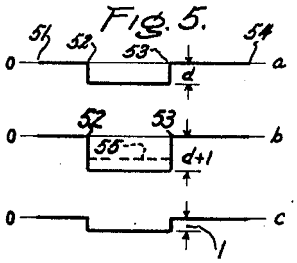
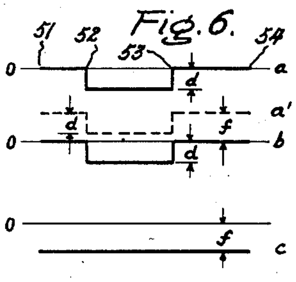
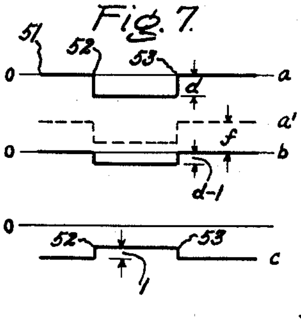
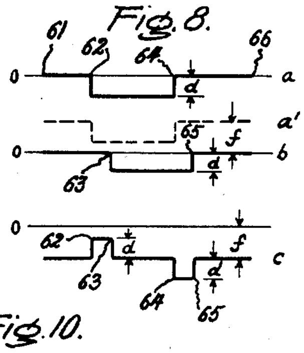
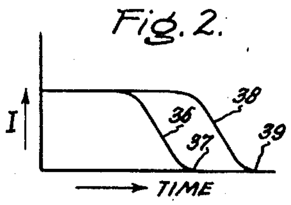
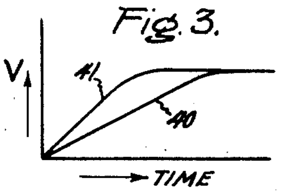
FIG. 10.
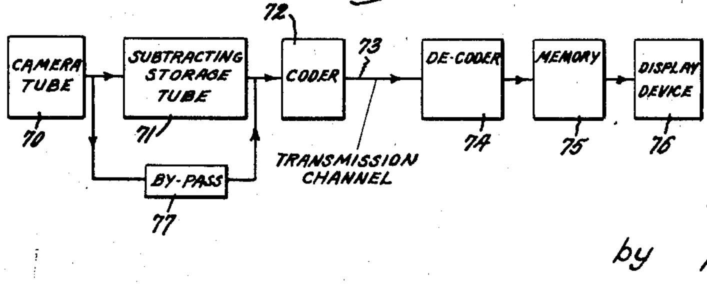
Inventor:
Harold R. Day Jr.
by Paul A. Frank
His Attorney.

2,951,899

INFORMATION STORAGE METHOD AND APPARATUS

Harold R. Day, Jr., Schenectady, N.Y., assignor to General Electric Company, a corporation of New York Filed Aug. 30, 1954, Ser. No. 453,113

12 Claims. (Cl. 178—6.8)

This invention relates to an improved information storage method and apparatus. While this invention is subject to a wide variety of variations and modifications, it is particularly suited for use with apparatus utilizing a semiconductive storage layer and will be particularly described in that connection.

In communications systems, it is particularly desirable to reduce the bandwidth necessary to convey a continuing flow of information, for example, by transmitting only the new information and combining this with previously transmitted information in a memory device. An example of a system of this type may consist of a video system in which the repeated portions of each picture element are not transmitted and only those portions of a video frame which have changed from a previous frame are transmitted. A system of this type need have a bandwidth only as wide as is necessary to transmit the anticipated new information per unit time period.

A subtraction device may be used to obtain a signal representative of the new information only and may, for example, consist of a video storage device having an output representative of the difference between a characteristic of two successive input signals. Known systems of this type utilize storage layers and secondary emission phenomena to obtain an output representative of a difference characteristic between successive input signals. Such systems tend to have limited resolution since the high velocity electron stream utilized in these systems results in the return of many secondary electrons to the storage surface as the storage surface potential approaches the collector potential. A storage device, such as that hereinafter described, which utilizes a low energy electron stream resulting in few secondary electrons, has inherent high resolution since it is not limited by secondary electron redistribution over the storage area.

It is, therefore, an object of this invention to provide an improved method and apparatus for storing information.

A further object of this invention is to provide an improved subtracting storage apparatus and method.

A further object of this invention is to provide an improved method and apparatus for storing information utilizing a storage layer having a surface maintained at electron emitting electrode potential.

It is also an object of this invention to provide an improved method and apparatus for storing and translating information and providing an output which is representative of a difference characteristic between two successive input signals.

Another object of this invention is to provide an improved subtracting storage device and method for use in a communications system.

According to an aspect of this invention, a method and apparatus are provided for storing information on a semiconductive storage layer by varying the potential of an electron emitting electrode structure in accordance with an applied signal and forming a potential pattern on a surface of the storage layer in accordance with the applied signal by maintaining the surface of the storage layer at emitting electrode potential.

The other aspects, objects and additional features of this invention are more completely described and defined in the succeeding description and claims taken in conjunction with the figures of the drawing in which Fig. 1 is a semi-schematic illustration of a storage device incorporating this invention; Figs. 2 and 3 illustrate some inherent characteristics of a semiconductive storage layer; Figs. 4 through 8 illustrate diagrams representing the operation of a storage device constructed in accordance with this invention; Fig. 9 illustrates a modification of the device illustrated in Fig. 1; and Fig. 10 illustrates, by way of example, a simplified information transmission system incorporating features of this invention.

A brief review of the general characteristics of semiconductive materials is considered desirable in order to assist in obtaining a complete understanding of this invention. A semiconductive material is defined generally as a material which is neither a good conductor nor a perfect insulator wherein conductors are generally metals characterized by the presence of many free electrons, and a good insulator has virtually none. A perfect insulator has no free electrons, since all of the outer electrons of insulators are tied up in interatomic bonds. Electrical conduction occurs in so-called insulators when subjected to an external stimulus, such as radiant energy. Therefore, there is no sharp distinction between insulators and materials which are defined as intrinsic semiconductors in which there are a few free electrons thermally torn loose from the atomic bonds.

Fig. 1 illustrates, by way of example, an apparatus which may be utilized in the practice of this invention and may be considered to consist of a portion of a television camera tube utilizing the principle of photoconductivity in conjunction with a low energy scan. Light from radiant energy source 10 is emitted in the directions generally defined by arrows 11, and is condensed and diffused by condenser and diffuser 12 and is projected to illuminate the glass wall 13. The glass wall 13 is provided with a thin transparent conductor 14. A semiconductive storage layer 15, which in this embodiment consists of a layer of photoconductive material, is placed in conductive contact with conductor 14. A cylindrical metal anode 16, having a fine wire mesh screen 17 across the end thereof and which is tapered to form a portion of the electron gun structure associated with electrodes 18 and 19, is placed in close proximity to storage layer 15. A cathode electrode 20 is provided with an electron emitting portion 21 which provides the source of electrons for scanning electron stream 22.

Cathode electrode 20 is connected to a point of reference potential, in this case ground, through input resistor 23 having a resistance in the order of 100 to 1,000 ohms. An input terminal 24 is provided so that an input signal may be applied between terminal 24 and ground to vary the cathode potential in accordance with an input signal. In order to maintain a constant electron stream current, control electrode 19 is coupled to the cathode electrode 20 through capacitor 25 and to ground through resistor 26 and bias source 27. This coupling maintains a constant potential difference between control electrode 19 and cathode electrode 20 when the cathode electrode potential is varied as a result of an input signal applied to terminal 24. In order to stop the flow of electrons from surface 21 during retrace, a blanking signal is applied to the input terminal 24 or, alternatively, to either one or both of electrodes 18 and 19. In the alternative mode of operation a decoupling means (not shown) is provided to decouple electrode 19 from cathode electrode 20.

Accelerating electrode 18 is provided with a source of positive potential 28. Anode 16 is provided with a source of positive potential 29 in the order of 300 volts.

The semiconductive storage layer 15 has an electron receiving surface 30 and an essentially fixed potential surface 31 which is maintained at an essentially fixed potential by transparent conductor 14. Transparent conductor 14 is coupled through output resistor 32, having sufficient resistance to match the input impedance of a video amplifier, and a source of positive bias potential 33, which maintains the fixed potential surface of the semiconductive storage layer at a positive potential above reference potential, to a point of reference potential, in this example ground. Terminal 34 is provided so that an output signal may be obtained between terminal 34 and ground.

Semiconductive storage layer 15 may consist of a deposited layer of photoconductive material, such as, for example, cadmium sulfide, antimony trisulfide or selenium which is deposited by well-known evaporating or coating techniques on the transparent conductor 14.

It is noted that the transparent conducting layer 14, such as tin oxide, may be applied by any well-known means to form a thin conducting layer. A transparent layer is not necessary for the practice of this invention. This invention may utilize a non-transparent conductor to maintain an essentially fixed potential over the surface of the semiconducting storage layer and a source of charge drift controlling stimuli, such as, for example, radiant energy in the form of visible light, may be applied directly to surface 30, rather than through conducting layer 14, in order to effect a given prescribed charge drift from electron receiving surface 30 to fixed potential surface 31.

The apparatus illustrated in Fig. 1 is essentially the same as a television camera tube which utilizes the principle of photoconductivity. The magnetic deflection and focusing components have been omitted from the illustration of Fig. 1 in the interests of simplifying the presentation of this invention. It is to be understood that the apparatus of Fig. 1 is provided with means for focusing a stream of electrons 22 having a beam diameter in the order of 1 to 2 mils and for scanning this electron stream 22 over the electron receiving surface 30 of the semiconducting layer 15 at a rapid rate. The scanning rate may be in the order of 15,750 complete cycles per second. The scanning and focusing apparatus may consist of concentric scanning and focusing solenoids in any conventional form, such as that shown and described, for example, in the chapter on "Television," pages 131–165, inclusive, Advances in Electronics, published in 1948 by the Academic Press, Inc., New York, New York.

The apparatus illustrated in Fig. 1 differs from conventional apparatus in that a low potential electron stream is utilized and the cathode electrode is provided with input terminal 24 and low resistance input resistor 23 so that the cathode electrode potential may be varied with respect to a reference potential in accordance with an input signal.

In an embodiment of this invention the transparent conductor 14 is maintained at a positive potential with respect to ground in the order of 20 volts. Electrons emitted by cathode surface 21 are accelerated to approximately 300 volts by anode 16. A number of these electrons pass through fine mesh screen 17 and are decelerated so that they strike the electron receiving surface 30 of the semiconducting layer 15 at a potential energy level in the order of a few volts. At this low energy level, the secondary electron emission ratio, i.e., the ratio of secondary electrons to impinging electrons, is such that substantially no secondary electrons are emitted by the semiconducting layer 15.

As each electron in the stream 22 strikes the surface 30 of semiconducting storage layer 15, a negative charge is built up on the area of electron receiving surface 30 at which the stream is directed and a corresponding positive charge is built up on fixed potential surface 31. The build-up of charge on surface 31 results in a flow of charge through resistor 32 which is proportional to the charge built up on surface 30. The flow of current through 32 is measured as an output voltage between terminal 34 and ground. As the charge is built up at any one point on the electron receiving surface 30, the potential of surface 30 drops and approaches the potential of cathode electrode 20. As soon as the charge on electron receiving surface 30 at this one point reaches the potential of cathode electrode 20, no more electrons are received by surface 30 at this point and all subsequent electrons in the electron stream are repelled and returned to positive collecting surfaces or the cathode electrode.

The beam current is maintained at a sufficiently high value of intensity so that a charge is collected on surface 30 until the potential of surface 30 is equal to the cathode potential. The time required for the charge to collect is less than the time required for the beam to move one beam diameter as it is scanned across the surface 30. Therefore, it is seen that the apparatus illustrated in Fig. 1 provides a means for maintaining the electron receiving surface 30 of the semiconductive layer 15 at the cathode potential. This apparatus is, therefore, capable of translating a time varying potential signal applied between 24 and ground into a space varying potential pattern on the surface of semiconductor 30 by means of the action of the electron stream in maintaining electron receiving surface 30 at cathode potential.

The family of curves illustrated in Fig. 2 of the drawing illustrates the effect of increased beam diameter in determining the time required to lower the potential of a single spot on electron receiving surface 30, having an area equal to the cross section of the beam, to the cathode electrode potential. The amount of charge required to do this is determined by the area of the spot being charged, the thickness of the semiconductive layer and the dielectric coefficient of the semiconductive material. Curve 36 illustrates the time required for an electron stream of a given size and current I to place sufficient negative charge on a spot on surface 30 to bring the potential of surface 30 to that of the cathode electrode so that the number of electrons received by the surface approaches zero at a point in time indicated by reference numeral 37. If the beam diameter is increased and the average electron stream current remains constant, curve 38 results and the time to bring the potential of this spot on surface 30 to that of the cathode electrode is increased to a point in time indicated by reference numeral 39.

It is noted that the effect of semiconducting layer 15 having an electron receiving surface 30 and a fixed potential surface 31 is similar to that phenomena observed in a capacitor. Fig. 3 illustrates a family of curves 40 and 41 representative of the charging time of a spot on surface 30 to reach cathode potential for successively increasing average values of electron stream current. It is apparent that the higher average stream current results in a more rapid charging rate, indicated by the steeper initial slope of curve 41, and, therefore, permits a higher scanning speed.

Fig. 4 illustrates the effect of placing a pulse signal on the cathode electrode. A negative pulse is applied to terminal 24 and swings the cathode electrode 20 *d* volts below the ground potential represented as 0 in line (*a*) of Fig. 4. Line (*a*) is representative of the potential pattern established by one line scan across electron receiving surface 30. The initial starting condition, for purposes of this explanation, established a 20-volt potential difference across storage layer 15. That is, surface 31 is at a potential established by power source 33 of approximately 20 volts above the reference potential and surface 30 is at the reference potential. As the beam travels from point 51 on electron receiving surface 30 to point 52, no electrons are received by surface 30 since it is at the cathode potential. At point 52 surface 30 receives electrons from stream 22 until the surface 30 is at a potential of $d$ volts below reference potential and at the potential of the cathode. As soon as cathode potential is reached, no more electrons are received by surface 30. This action continues as the electron stream is scanned along surface 30 between points 52 and 53. Therefore, from point 52 to point 53, the potential of surface 30 is at $d$ volts below reference potential and from 53 to 54, no electrons are received by electron receiving surface 30.

It is apparent that whenever a charge from the electron stream strikes the surface of the semiconductive storage layer, a current corresponding to that charge is induced in the output resistane 32 and an output signal voltage is observed. When the potential of the cathode is varied over a small range, such as voltage $d$, during the scan, the potential of the area of the storage surface 30 being struck by the electron stream follows this potential, provided there is sufficient beam current, and a potential pattern is set up on the storage surface which corresponds to the input signal. Thus a time-varying potential function applied to the cathode is transformed into a space-varying function and is retained on the storage surface until the following scan and an output voltage is observed across load resistor 32 during the scan.

It is now assumed that a subsequent signal having the same time-varying voltage relation and the same negative potential $d$ is applied to input terminal 24. The resulting voltage pattern for the same line of the next successive scan is illustrated by line ($b$) in Fig. 4. Since the cathode potential is varied during the second scan in exactly the same manner as it was during the previous scan, no electrons strike the surface 30 and, therefore, no output signal is observed across resistor 32 during the second scan. The absence of an output signal is illustrated by the line ($c$) in Fig. 4.

Fig. 5 illustrates the situation which obtains when the signal applied to the cathode is made more negative on the next successive scan. Line ($a$) in Fig. 5 illustrates the potential variation of the cathode electrode 20 during a horizontal line of one scan. A corresponding potential pattern is established on electron receiving surface 30 in a manner as has been previously described. The potential variation of cathode electrode 20 and the potential pattern surface 30 on the next successive scan is illustrated by line ($b$). By way of example, the cathode potential drops $d+1$ volts at point 52 and rises to reference potential at point 53. The potential of the first scan is represented in line ($b$) by the dashed line 55 at minus $d$ volts. Line ($c$) illustrates the resulting flow of charge on the fixed potential surface as a result of the second scan. The second scan, the potential pattern of which is represented by line ($b$), results in the effective erasing of the first scan pattern and the formation of a new potential pattern having a region between points 52 and 53 at a potential of $d+1$ volts below reference potential. The change in potential by 1 volt below reference potential results in a corresponding charge shift on the opposing fixed potential surface 31 and a resulting flow of current through output resistor 32. The effect of the flow of current through output resistor 32 is represented in Fig. 5 by line ($c$) which illustrates a negative 1-volt signal change.

The operation of the apparatus illustrated in Fig. 1, as thus far described, operates only as long as the change in cathode potential is negative with respect to the signal applied to the cathode during the previous scan. It is apparent that if at any time the cathode is less negative than it was at the corresponding point of the previous scan no charge can strike the storage surface and the output current through resistor 32 is zero just as it was when the cathode potential was the same during the two successive scans in the case illustrated in Fig. 4.

A positive indication of the difference between two such signals is obtained by providing means for controlling the rate at which the potential level of the potential pattern resulting from a signal applied to the cathode drifts in a positive direction toward the potential of the fixed potential surface. This means may consist of any stimulus which effectively raises the potential level of the electron receiving surface.

In the embodiment of this invention illustrated in Fig. 1 of the drawing, potential drift control is obtained by providing a means for increasing the conductivity of the semiconductive storage layer so that the charge on surface 30 drifts toward fixed potential surface 31 at a predetermined rate thereby raising the potential of surface 30. Semiconductive materials are available which are sufficiently conducting so that the potential of surface 30 becomes sufficiently positive between successive scans so that a positive change in the potential of the cathode between corresponding portions of successive scans results in a current flow through resistor 32 and a resulting difference output signal. It is generally more desirable to provide a means for controlling the rate of charge drift across the semiconductive storage layer 15 so as to just accommodate the maximum positive signal which the system is required to handle.

A stimulus, for example, a form of energy, such as heat or other forms of radiant energy, is applied to semi-conductive layer 15 to control the rate of charge drift. In this embodiment, which is given merely by way of example, a radiant energy source, such as a source of visible light 10, is provided to project light through condenser and diffuser 12, transparent conductor 14, and onto the semiconductive storage layer 15.

Fig. 6 illustrates line ($a$) which is representative of the potential variation applied to cathode electrode 20 through input terminal 24 and the corresponding potential pattern along one horizontal line scan on electron receiving surface 30. In the time interval between successive scans, the entire potential pattern established on electron receiving surface 30 drifts in a positive direction $f$ volts due to the charge drift through semiconductive storage layer 15. It is noted that the charge drift is a continuing process and starts the instant charge is placed on surface 30. Line ($b$) illustrates the potential pattern of the cathode electrode 20 during the next successive scan and line ($a'$) illustrates the shift taken by the pattern established during the first scan. It will be observed that the second scan illustrated by curve $b$ has exactly the same configuration as the first scan illustrated by curve $a$. The resulting second potential pattern established on electron receiving surface 30 erases the first pattern and is everywhere negative by a voltage $f$ from the potential pattern established during the first scan so that during the scan, there will be a constant flow of charge, proportional to the electron build-up during the second scan, flowing through resistor 32 and a constant output signal of minus $f$ volts is observed throughout the scan. Therefore, the drift of charge from surface 30 to 31 results in an effective direct current biasing voltage in the output circuit 32.

Fig. 7 illustrates the operation of this invention when the direction of signal change or cathode potential change is in a positive direction between successive scans. Line ($a$) illustrates the potential pattern followed by the cathode electrode 20 during a first scan and is representative of the corresponding potential pattern formed on electron receiving surface 30. Between successive scans, the pattern established by the first scan drifts in a positive direction $f$ volts. The potential pattern established by the next successive scan is illustrated by line ($b$). It will be noted that this potential pattern has a potential dip of $d-1$ volts, i.e., the potential dip is 1 volt less negative than on the first scan. The resulting voltage output across resistor 32, as a result of the change of charge on electron receiving surface 30 and the corresponding flow of charge through resistor 32, results in an output signal represented by the line (*c*). This line is negatively biased and has a positive portion between points 52 and 53 on the scan.

Fig. 8 illustrates the result of a shift in the time relationship between two successive scans. The line (*a*) illustrated in Fig. 8 has a negative voltage pulse of *d* volts between the times corresponding to point 62 and point 64 of the corresponding potential pattern formed by a first scan. In the time interval before the next successive scan, the entire pattern drifts in a positive direction *f* volts. The next successive scan is illustrated by line (*b*). The second successive scan has a negative voltage dip of *d* volts which occur between the times corresponding to points 63 and 65 of the potential pattern established on electron receiving surface 30. The resulting voltage output across resistor 32 is illustrated by line (*c*). It is observed that the resulting voltage output consists of a positive voltage pulse between times corresponding to points 62 and 63 on the scan and a negative pulse between the times corresponding to points 64 and 65 on the scan, both of which are biased to a negative potential of *f* volts.

It is noted that for purposes of this explanation, it is assumed that electron receiving surface 30 is at zero potential and that fixed potential surface 31 is at a positive potential of 20 volts. The natural effect of a semiconducting storage layer is for both surfaces to approach the same potential. Therefore, in the absence of an electron stream, surface 30 tends to assume the same potential as surface 31.

The cathode may be maintained at reference potential, above reference potential or below reference potential and a time-varying potential signal applied to the cathode to vary the cathode potential results in a spacing varying potential pattern at cathode potential on the electron receiving surface of the storage layer. A signal, which has been stored on surface 30, may be obtained at output terminal 34, by writing over the same line or lines with a zero signal input to the cathode. It is apparent that this invention has been described by the use of simple wave forms, merely by way of example, and that it is obviously suited to store and subtract signals having complicated wave forms, such as conventional video signals.

Alternatively, this invention may be practiced by utilizing a high resistivity semiconductive storage layer placed in contact with a conductive surface to maintain a fixed potential over a surface of the storage layer.

The fragmentary portion of an alternative apparatus is illustrated in Fig. 9. A source of charge drift controlling stimuli consists in this example of cathode electrode 20*a* having emitting portion 21*a* which provides a flood beam of high energy electrons. A signal is written on surface 30 at cathode electrode potential in the same manner as hereinbefore described. A flood beam of electrons from cathode electrode 20*a*, having electron energies above the first cross-over point of the semiconductive layer so that the secondary electron emission ratio is greater than unity, is caused to continually illuminate surface 30. The continual illumination causes more electrons to leave surface 30 and be collected by a positive potential collector, such as 17, than arrive at the surface from electrode 20*a*. Therefore, the potential of surface 30 drifts in a positive direction and a potential pattern written by electron stream 22 drifts in a positive direction. The secondary emission is maintained at a sufficiently low level so that there is substantially no redistribution of electrons on the storage surface. It is apparent that an output representative of a difference function between two successive input signals is obtained from this apparatus in the same manner as hereinbefore described.

In view of the foregoing, it is apparent that an apparatus and method are illustrated and described for obtaining a signal representative of a difference characteristic between two successive input signals, that the input signals may be either positive or negative and that an output representative of a positive, as well as a negative, change in any characteristic, including time or phase, of successive input signals is obtained with the method and apparatus of this invention.

It is to be clearly understood that the illustration of apparatus in Figs. 1 and 9 are given merely by way of example. It is apparent that the concept of this invention may be applied to a wide variety of apparatus having a semiconducting layer which has an electron receiving surface and a fixed potential surface, such that an electron stream from an electron emitting cathode electrode can be caused to form a varying potential pattern at the cathode electrode potential on the electron receiving surface which causes a corresponding change of charge on the fixed potential surface.

By varying the scan rate and maintaining sufficient beam current intensity, apparatus in accordance with this invention is capable of subtracting, at video rates, bits of information separated in time by relatively large fractions of a second, in the order of 1/15 second or longer, and separated by very much shorter time intervals, limited only by the electron transit time, semiconductive material characteristics and available beam scanning velocities.

It is apparent that the low beam velocity utilized in accordance with apparatus of this invention results in substantially no secondary electron emission as a result of the beam forming the potential pattern in accordance with the signal applied to the cathode and further that a potential pattern is established on electron receiving surface 30 by varying the potential level of the cathode electrode rather than by varying the beam current, i.e., the energy level of the beam is shifted and not the current level as is the case when the grid-to-cathode potential is varied. Since there are very few secondary electrons from the potential pattern forming stream 22 available to be redistributed, the apparatus of this invention is inherently free of secondary electron redistribution which limits the resolution available in storage devices utilizing high velocity electron streams.

The applications of the storage device and method hereindescribed are many-fold. For example, apparatus of this type is ideally suited for use in television transmission systems or in any system in which it is necessary to transmit large volumes of information over a limited bandwidth transmission channel.

Fig. 10 illustrates a block diagram of a system embodying the apparatus and method of this invention. The apparatus illustrated in Fig. 10 consists of a camera tube and associated equipment 70 which is coupled to subtracting storage apparatus 71. The output of storage apparatus 71 is coupled to a coder 72. The output of coder 72 is transmitted by transmission channel 73 to decoder 74 at the receiving station. The output of the decoder is combined with information held in a memory device 75 and the combined information is presented by display device 76. Bypass channel 77 is provided to periodically send a complete picture to coder 72. It is apparent that the transmission channel 73 may take any number of forms, such as, for example, wire, magnetic tape or radiant energy.

The operation of the system illustrated in Fig. 10 is as follows: A video image is picked up by the camera tube and associated circuit 70 and applied to a subtracting storage tube constructed in accordance with this invention. For example, the first image picked up by camera tube 70 is completely transmitted by subtracting storage tube 71 to coder 72 and the output thereof transmitted along transmission channel 73 to decoder 74. The coder consists of apparatus for translating the video information into the form of, for example, pulse time modulated signals and the decoder reconverts the pulse time modulated signals into the form of the original video information which is transmitted to memory device 75. Memory device 75 retains the repeated components of the previous video signal picked up by camera tube 70 and relays a video signal composed of the repeated video components and new video components to an appropriate display device, such as a television receiving tube. In this instance, the entire picture component is transmitted.

The next successive picture element, occurring along a corresponding scan line, which is picked up by camera tube 70, is relayed to storage tube 71 and only that portion which has changed from the immediate succeeding picture element is transmitted to coder 72 so that transmission channel 73 carries only the difference signal obtained by subtracting the second video component from the first video component. The output of decoder 74 is fed to memory device 75 which combines the changed portion of the picture element with the unchanged portion of the scan so that the output of the memory device results in a complete picture element or line appearing on display device 76.

It is apparent that the operation of the system as thus far described makes no provision for a receiving station, such as a television receiver, which is not operating at the time the first complete image is transmitted or for a noise pulse introduced into the system. In the first case, the memory device 75 does not have a complete image so that only new information is displayed and in the second case, the noise pulse continues to be repeated and displayed indefinitely. Therefore, it is necessary to periodically, for example, once every five frames, to transmit redundant information which, in the example of a television system, amounts to sending a complete image every fifth frame. Bypass 77 is provided for this purpose so that the whole picture is referred to absolute in memory device 75 after each five frames and any previously introduced noise is eliminated.

It should be appreciated that the above example is given merely as an illustration of an application of this invention to a video transmission system and that this apparatus is adaptable to the transmission of any number of other types of information.

While this invention has been described in conjunction with a specific apparatus and only a limited number of the possible methods of operation and application have been described, it will be appreciated that the apparatus and method are subject to a wide variety of modifications and it is intended to cover all such modifications falling within the true spirit and scope of this invention.

What I claim as new and desire to secure by Letters Patent of the United States is:

1. An information storage apparatus for producing an output signal that is a function of the difference between two successively applied signals, said apparatus comprising an electron emitting electrode structure, a semiconductive storage layer, means coupled to a surface of said layer for maintaining the surface at an essentially fixed potential with respect to the magnitude of output signal, said layer having an electron receiving surface substantially opposed to said fixed potential surface, means coupled to said electrode for applying an input signal to vary the electrode potential in accordance with an input signal, output means coupled to said fixed potential surface, and means for accelerating a stream of electrons successively to different regions of said electron receiving surface to maintain the respective regions of the electron receiving surface potential at the electrode potential during the period the electron stream is directed thereto.

2. An information storage apparatus for producing an output signal that is a function of the difference between two successively applied signals, said apparatus comprising an electron emitting electrode structure, a semiconductive storage layer, means coupled to a surface of said layer to maintain the surface at a positive potential with respect to a reference potential and essentially constant with respect to the magnitude of output signal, said layer having an electron receiving surface substantially opposed to said constant potential surface, means coupled to said electrode for applying an input signal to vary the electrode potential with respect to said reference potential in accordance with the input signal, output means coupled to said constant potential surface and means for accelerating a stream of electrons successively to different regions of said electron receiving surface to maintain the respective regions of the electron receiving surface potential at the electrode potential during the period the electron stream is directed thereto.

3. An information storage apparatus for producing an output signal that is a function of the difference between two successively applied signals, said apparatus comprising an electron emitting electrode structure, a semiconductive storage layer, means coupled to said layer for maintaining a surface of said layer at a positive potential with respect to a reference potential, said positive potential being substantially constant with respect to the magnitude of said output signal, said layer having an electron receiving surface substantially opposed to said positive potential surface, means coupled to said electrode for applying an input signal to vary the electrode potential with respect to said reference potential in accordance with the input signal, output means coupled to said positive potential surface, means for accelerating a stream of electrons successively to different regions of said electron receiving surface to maintain the respective regions of the electron receiving surface potential at the electrode potential during the period the electron stream is directed thereto, and means to control the rate at which the potential level of said electron receiving surface drifts in a positive direction.

4. An information storage apparatus for producing an output signal that is a function of the difference between two successively applied signals, said apparatus comprising an electron emitting electrode, a photoconductive storage layer, means coupled to said layer for maintaining a surface of said layer at a positive potential with respect to a reference potential, said positive potential being substantially constant with respect to the magnitude of said output signal, said layer having an electron receiving surface substantially opposed to said positive potential surface, means coupled to said electron emitting electrode for applying an input signal to vary the electrode potential with respect to said reference potential in accordance with the input signal, output means coupled to said positive potential surface, a radiant energy source coupled to said storage layer to control the rate of charge drift from the electron receiving surface to the positive potential surface and means for accelerating a stream of electrons from said electrode structure successively to different regions of said electron receiving surface to form a potential pattern at the electrode potential on the respective regions of said electron receiving surface during the period the electron stream is directed thereto and corresponding to the time-varying potential function of an applied signal whereby a signal corresponding to a difference function between two successively applied signals is obtained from the output means.

5. An information storage apparatus for producing an output signal that is a function of the difference between two successively applied signals, and apparatus comprising an electron emitting electrode, a semiconductive storage layer, means coupled to said layer for maintaining a surface of said layer at a positive potential with respect to a reference potential, said positive potential being substantially constant with respect to the magnitude of said output signal, said layer having an electron receiving surface substantially opposed to said positive potential surface, means coupled to said electron emitting electrode for applying an input signal to vary the electrode potential with respect to said reference potential in accordance with the input signal, output means coupled to said positive potential surface, a source of high energy electrons oriented to strike said electron receiving surface to result in secondary electron emission and control the rate at which the potential level of said electron receiving surface drifts in a positive direction, and means for accelerating a stream of electrons from said electrode structure successively to different regions of said electron receiving surface to form a potential pattern at the electrode potential on the respective regions of said electron receiving surface during the period the electron stream is directed thereto and corresponding to the time-varying potential function of an applied signal whereby a signal corresponding to a difference function between two successively applied signals is obtained from the output means.

6. An information transmission system comprising an information accumulating device, means coupling the output of said accumulating device to storage apparatus including means for converting a time-varying potential function applied to an electron emitting electrode into a space-varying function on a semiconductive storage layer at the potential of said electrode during the period when electrons from said electron emitting electrode are directed thereto and including means for obtaining an output signal from said apparatus representative of a difference characteristic of successive output signals from said accumulating device, means for combining successive output signals representing said difference information of said accumulating device, means coupled to said storage apparatus for transmitting said output signal representing difference information and means coupled to said combining means for displaying the combined output whereby said transmitting means channel bandwidth is narrow relative to the channel bandwidth necessary to transmit all signal information from said accumulating device.

7. A system for transmitting information corresponding to a time varying electrical input signal, said system comprising a subtraction storage device for producing a time varying output signal that is a function of only the differences of successive time varying input electrical signals that occur over definite periods of time, means for transmitting an electrical signal that is a function of the time varying output signal, and means for receiving and storing the transmitted signal so that the stored signals are a function of the input time varying electrical signals.

8. The system as defined in claim 7 and means for periodically energizing said transmitting means with said varying electrical input signal for a time equal to one definite period after a certain number of these periods, whereby said transmitting means periodically transmits an electrical signal that is a function of said time varying electrical input signal.

9. A system for transmitting television signals over a relatively narrow band comprising a subtraction storage device for producing a time varying output signal that is a function only of the differences of successive frames of television input signals, and means for transmitting a signal that is a function of the output signal of said subtraction storage device.

10. The television transmitting system of claim 9 and a television receiving system comprising means responsive to the transmitted signal for producing a difference signal that is similar to the output signal from said subtraction storage device, and a storage device for storing the difference signals and for producing output signals corresponding to the input television signals applied to the transmitter.

11. An information storage apparatus for producing an output signal that is a function of the difference between two successively applied signals comprising an electron emitting electrode structure, a storage structure comprising a semiconductive portion in close capacitance coupling with a conductive portion, means for maintaining said conductive portion at a potential essentially constant with respect to the magnitude of the output signal, means coupled to said electrode structure for applying an input signal to vary the potential of the electrode structure, means coupled to said conductive portion for producing an output signal that is a function of the flow of current to and from said conductive portion, and means for accelerating a stream of electrons from said electrode structure to strike successively different regions of said storage structure such that the magnitude of the stream of electrons is sufficient to maintain the respective regions at the electrode structure potential during the period the electron beam is directed thereto.

12. An information storage apparatus for producing an output electrical signal that is a function of the differences between two successively applied input electrical signals, said apparatus comprising means for storing electrons from an incident electron beam, output means electrically coupled to said storing means for producing an output voltage that is a function of the current flow to said storing means, means for impinging said storing means with a constant current electron beam, the beam voltage of which is a function of applied electrical signals, and means for continually removing electrons from said storing means at a comfortable rate.

References Cited in the file of this patent

UNITED STATES PATENTS

| | | |
|---|---|---|
| 2,202,605 | Schroter | May 28, 1940 |
| 2,321,611 | Moynihan | June 15, 1943 |
| 2,368,884 | Schade | Feb. 6, 1945 |
| 2,548,789 | Hergenrother | Apr. 10, 1951 |
| 2,622,219 | Schagen | Dec. 16, 1952 |
| 2,629,010 | Graham | Feb. 17, 1953 |
| 2,629,011 | Graham | Feb. 17, 1953 |
| 2,667,596 | Szegho | Jan. 26, 1954 |
| 2,687,484 | Weimer | Aug. 24, 1954 |
| 2,687,492 | Szegho et al. | Aug. 24, 1954 |
| 2,699,512 | Sheldon | Jan. 11, 1955 |